United States Patent Office 3,535,887
Patented Oct. 27, 1970

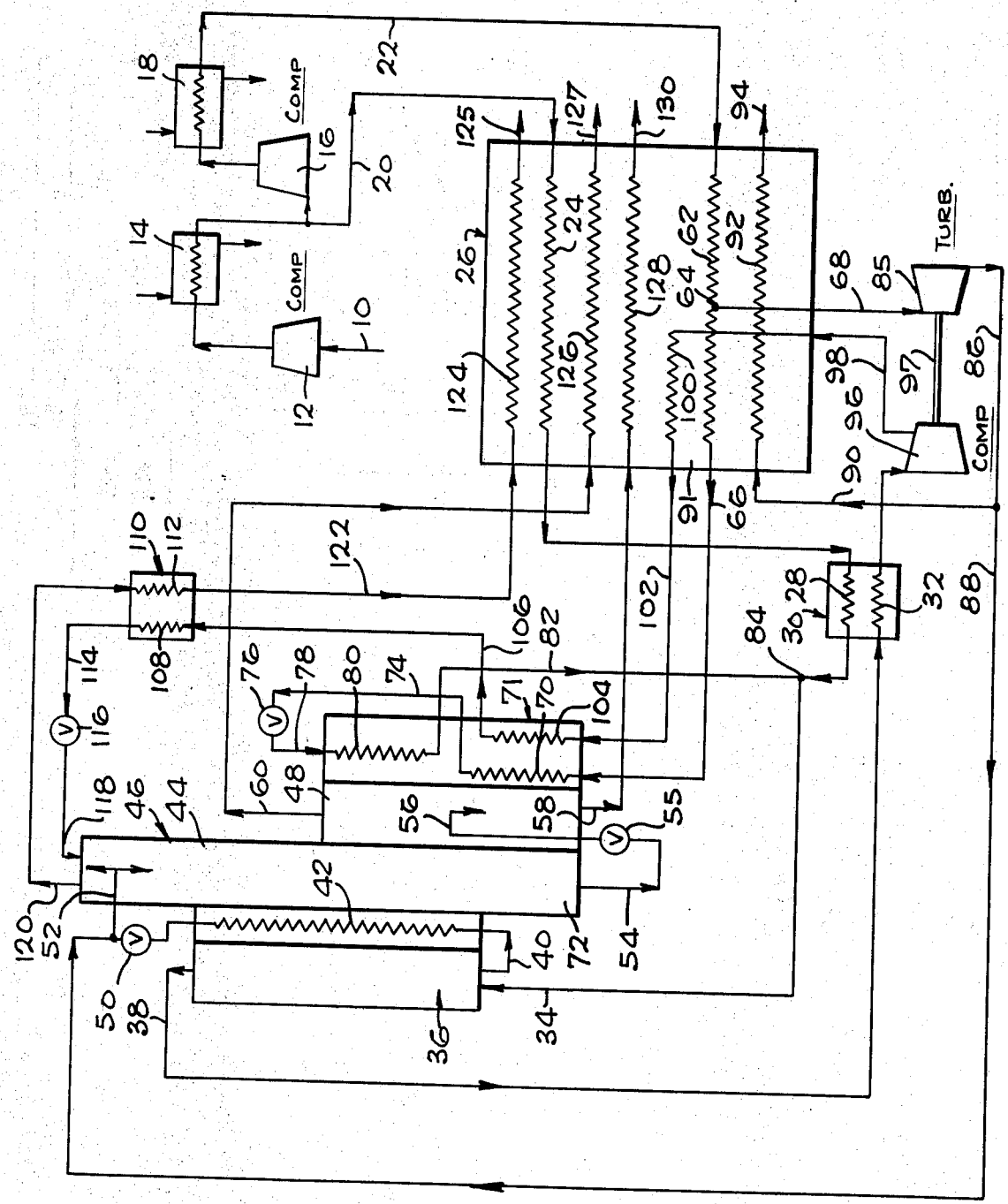

3,535,887
HIGH PURITY OXYGEN PRODUCTION FROM AIR BY PLURAL STAGE SEPARATION OF PLURAL STREAMS OF COMPRESSED AIR WITH UTILIZATION OF RECOMPRESSED OVERHEAD AS A SOURCE OF HEAT EXCHANGE
Michael L. Hoffman, Beverly Hills, Calif., assignor, by mesne assignments, to McDonnell Douglas Corporation, Santa Monica, Calif., a corporation of Maryland
Filed Dec. 1, 1967, Ser. No. 687,342
Int. Cl. F25j 3/04
U.S. Cl. 62—22
16 Claims

ABSTRACT OF THE DISCLOSURE

Process and system for producing high purity oxygen by air separation, which involves use of a relatively high pressure air feed stream and an intermediate pressure air feed stream, and includes cooling the intermediate pressure stream and a first portion of the high pressure stream approximately to their respective saturation temperatures, cooling a second portion of the second high pressure air stream and work expanding such cooled second portion and employing such work expanded stream for cooling the compressed air feed streams, introducing the first intermediate pressure cooled compressed air stream into a first separation zone, removing cold compressed nitrogen as overhead and withdrawing an oxygen-rich liquid air mixture from such first separation zone, subcooling and throttling the last-mentioned liquid air mixture and introducing same as feed into a second main distillation zone, introducing a second work expanded portion of the high pressure air feed stream also as feed to the second main distillation zone, the second zone operating at a pressure lower than the pressure of the first separation zone, withdrawing nitrogen overhead from the main distillation zone, withdrawing crude liquid oxygen containing a minor portion of argon from the main distillation zone, introducing the crude liquid oxygen as feed into a third argon separation zone, separating argon and removing high purity oxygen in the third zone, further compressing the cold nitrogen overhead from the first separation zone and employing the cold further compressed nitrogen for reboiling duty and then finally as reflux to the main distillation zone, and employing the first cooled compressed portion of the high pressure air feed stream also to provide reboiling and condensing duty in the system, and then preferably combining the last-mentioned air feed stream with the compressed saturated intermediate pressure air stream for use as feed in the first separation zone, and preferably also passing waste nitrogen and argon streams and the oxygen product stream into heat exchange relation with the compressed air feed streams for cooling same; the first separation zone, the second main distillation zone and the third argon separation zone preferably being associated in heat exchange relation to provide condensing and reboiling duty in each of such zones, and preferably under conditions to provide "differential" distillation in the main distillation zone and also in the other above-noted associated zones, as described more fully below.

This invention relates to the separation of the components of an air mixture by low temperature rectification, and is particularly concerned with procedure and a system for the separation of oxygen in substantially pure form, e.g., as a gas, employing an air feed composed of a relatively high pressure feed stream and a substantial portion of an intermediate pressure air feed stream, preferably utilizing multiple separation zones which are suitably associated in heat exchange relation and employing in one or more of said zones the principles of "differential distillation."

A conventional system for oxygen production by low temperature air rectification, employs a double column and generally employs an air feed at a pressure of about 6 to 7 atmospheres. According to the present invention, it is sought to reduce the air feed pressure requirement and improve the economy of such prior art system by providing at least a substantial portion of the air feed at a lower or intermediate pressure.

The concept of the present invention utilizes an initial separation zone operated at a higher pressure than the main distillation zone, and in conjunction with an argon separation zone, the initial separation zone receiving a portion of the air feed at an intermediate pressure, and providing cold overhead nitrogen vapor which when cold compressed, is utilized to provide reboiling duty against liquid oxygen in the argon separation zone and the main distillation zone, and can then be employed as reflux in the main distillation zone.

In addition, a portion of the cold relatively high pressure air stream is work expanded and regeneratively employed for cooling the compressed air feed streams, while a portion of such high pressure air feed stream is also employed for providing reboiling and condensing duty in the system and then combined with intermediate pressure compressed air feed for introduction into the initial separation zone.

Thus, there is provided according to the invention a process or system for the separation of high purity oxygen from air, which comprises providing two compressed air feed streams, a first air stream being an intermediate pressure stream and a second being a relatively high pressure stream, cooling the first intermediate pressure stream and a first portion of the second high pressure stream approximately to their respective saturation temperatures, cooling a second portion of the second high pressure air stream, work expanding the cooled second portion of the second stream and further reducing the temperature thereof, passing at least a portion of the resulting work expanded and further cooled second portion of the second air stream into heat exchange relation with the compressed air feed streams for cooling same as aforesaid, introducing said first cooled compressed air stream into a first separation zone, removing cold compressed nitrogen as overhead from said zone, withdrawing an oxygen-rich liquid air mixture from said first separation zone, reducing the pressure of said liquid air mixture and introducing the resulting oxygen-rich liquid air mixture as feed into a second main distillation zone, said second zone operating at a pressure lower than the pressure in said first separation zone, withdrawing nitrogen overhead from said main distillation zone, withdrawing crude liquid oxygen containing a minor portion of argon from the bottom of said main distillation zone, introducing said crude liquid oxygen as feed into a third argon separation zone, separating argon and removing high purity oxygen from said crude liquid oxygen in said third separation zone, withdrawing high purity oxygen and an overhead argon-containing vapor from said third zone, employing said first cooled compressed portion of said second high pressure air stream to provide reboiling and condensing duty, further compressing said cold nitrogen overhead from said first separation zone, and employing said cold further compressed nitrogen for reboiling duty, and then as reflux to the main distillation zone.

According to preferred parctice of the invention, the first separation zone, the second main distillation zone and the third argon separation zone are suitably associated in heat exchange relation to provide the requisite condensing and reboiling duty for each of the zones.

In preferred practice, greater efficiency is achieved by subcooling the oxygen-rich liquid air mixture withdrawn from the first higher pressure separation zone prior to throttling thereof and introduction thereof as feed into the lower pressure main distillation zone. This is accomplished by passing the oxygen-rich liquid air mixture from the first separation zone in heat exchange relation with the adjacent initial separation zone and main distillation zone, such heat exchange preferably being accomplished along the lengths of such zones, to aid in effecting a non-adiabatic differential distillation in said zones, as described more fully below.

Also, the cold compressed nitrogen preferably is employed for providing the above-noted reboiling duty and reflux by first cooling the compressed nitrogen for removal of its superheat, then passing the compressed nitrogen in heat exchange relation along the lower portion of the argon separation zone against boiling oxygen therein to provide reboil, followed by throttling the subcooled liquid nitrogen and employing same as reflux in the main distillation zone. Also, preferably a portion of the high pressure air feed stream is utilized for reboiling and condensing duty in the system by passing such portion of cooled compressed high pressure air stream first into heat exchange relation along the lower portion of the argon separation zone to provide reboil heat and then throttling the existing subcooled air stream and passing same in heat exchange relation along the upper portion of the argon separation zone to provide condensing duty therein.

Preferably, the portion of the cooled high pressure air stream employed initially for providing reboiling and condensing duty in the system, is combined with the cooled low pressure air stream as feed for the initial separation zone, and a portion of the work expanded compressed high pressure air stream can be employed as feed to the main distillation zone.

The resulting high purity oxygen from the argon separation zone, the overhead nitrogen stream from the main distillation zone, and the overhead argon-containing vapor from the argon separation zone, as well as the above-noted work-expanded portion of high pressure air feed stream, are passed in heat exchange relation with the compressed air feed streams for cooling same.

The invention process and system result in a substantially economy particularly in the air feed compression cost for producing high purity oxygen, thereby representing a substantial advance in the art over the conventional double column system wherein the entire air feed is at high pressure. Also, the energy derived from the work expansion of a portion of the high pressure air feed stream is preferably utilized for the compression of the cold overhead nitrogen from the initial separation zone, which is then utilized for reboiling, and as reflux to the main distillation zone, as noted above.

The invention will be more clearly understood by the description below of a preferred embodiment of the invention, taken in connection with the accompanying drawing illustrating such preferred embodiment.

Referring to the drawing, an air feed at 10 is first compressed at 12 to about 2.4 atmospheres, is cooled by passage through the cooler 14, and a substantial portion, e.g., about 60% of such compressed air, is further compressed at 16 to a pressure of about 4.5 atmospheres and is cooled by passage through the cooler 18. Thus, the initial air feed stream at 10 is compressed into two pressure streams, a first intermediate or low pressure stream 20, and a relatively high pressure stream 22.

The first intermediate or low pressure air stream 20 is cooled approximately to its saturation temperature by passage through coil 24 of a main heat exchanger 26, and is then further cooled by passage through coil 28 of a heat exchanger 30 against cold nitrogen vapor passing through coil 32, and the resulting compressed saturated air is then fed at 34 into the bottom of a high pressure initial separation column or zone 36 which is in heat exchange relation with other components of the system as described in detail hereinafter. Sufficient refrigeration is provided in separation zone 36 to permit separation of the feed air therein into a cold nitrogen overhead vapor at 38, at a pressure of about 2.4 atmospheres and a temperature of about 84° K., and an oxygen-rich liquid air mixture, e.g., containing about 47% oxygen, which is withdrawn at 40 from the bottom of column 36.

The oxygen-rich liquid air mixture at 40 withdrawn from the bottom of the high pressure separation zone 36 is passed through one or more passages 42 in heat exchange relation with and along the length of the initial separation zone 36 and along the adjacent main distillation column 44 of the entire distillation unit 46, and which also includes an argon separation zone or column 48 disposed in heat exchange relation with the main distillation column 44 and on the opposite side thereof from the initial separation zone 36, and a heat exchanger unit 71. The oxygen-rich liquid mixture 40 is subcooled by passage through the passages 42, and the subcooled liquid mixture is throttled at 50 to a pressure of about 1.3 atmospheres, the pressure in distillation column 44, and a temperature of about 84° K. and the resulting throttled oxygen-rich air mixture is introduced at 52 as feed into the main distillation column 44.

In the main distillation zone or fractionating column 44, the oxygen-rich air mixture entering at 52 is permitted to expand in the column, the nitrogen liquid which descends from the top of the column as reflux becoming richer in oxygen and leaner in nitrogen as it proceeds towards the bottom of the column, while the stream of oxygen vapor which rises from the bottom of the column becomes richer in nitrogen as it rises toward the top of the column. By addition of heat to the lower portion of the column by the subcooling of the oxygen-rich liquid mixture in passages 42, together with the addition of heat from the lower portion of the argon separation column 48, and the removal of heat from the upper portion of column 44 by the condensing duty provided by the upper portion of the subcooling passages 42, the descending liquid and ascending vapor in the column are brought into equilibrium throughout the height of the column, effected by a non-adiabatic differential distillation occurring throughout the length of distillation column 44 due to passage of the heat exchange medium in passages 42, in heat exchange relation lengthwise of the column, and heat transfer along the column effected by the associated zones 36 and 48, as described more fully below.

A crude liquid oxygen containing 96% to 97% oxygen and about 2% to 3% argon, together with a very small amount of nitrogen, is withdrawn at 54 from the bottom of the main distillation zone 44, and at a temperature of about 89° K. is throttled at 55 from a pressure of about 1.5 atmospheres to a pressure of about 1.3 atmospheres, the pressure in the argon separation zone 48, and is fed at 56 to the argon separation zone 48 where it is separated into pure vapor oxygen, e.g., containing about 99.5 to about 99.7% oxygen, which is withdrawn at 58 from the bottom of zone 48, and a crude argon fraction, consisting approximately of 40% argon, 40% nitrogen and 20% oxygen, which is withdrawn as vapor at 60 from the top of the argon separation zone 48.

The second relatively high pressure air feed stream 22, which has been compressed to about 4.5 atmospheres, is passed through coil 62 of the main heat exchanger 26, and is split off midway of coil 62, at 64, into a first portion which passes entirely through coil 62 and exits the heat exchanger at 66, and a portion 68 which is treated as hereinafter described. The first portion 66 of the high pressure air stream, constituting about 65% of the high pressure air stream 22, and approximately at its saturation temperature, is passed through one or more heat exchange passages 70 of the heat exchanger 71, in heat exchange relation with the lower portion of the argon separation zone 48, the passages 70 extending lengthwise of column 48. The compressed air stream 66 is condensed in the passages 70, providing reboil heat in the lower portion of argon separation zone 48, and fractionation taking place in the lower portion of argon separation zone 48 providing reboil heat in the lower portion 72 of column 44. The condensed nitrogen exiting the upper ends of passages 70, at 74, is throttled at 76 to a pressure of about 2.4 atmospheres and a temperature of about 84° K., and is introduced at 78 into the upper ends of one or more passages 80 disposed lengthwise in heat exchange unit 71, in heat exchange relation with the upper portion of the argon separation zone 48. The throttled air stream is vaporized in passages 80, providing condensing duty and reflux in the upper portion of argon separation zone 48, and the exiting warmed air stream at 82 is combined at 84 with the low pressure air feed stream, for introduction of the combined mixture at 34 as feed into the high pressure initial separation zone 36, as previously described.

The second minor portion 68 of the cooled high pressure air stream 22, is expanded through an expander or turbine 85 to a reduced pressure of about 1.3 atmospheres and a reduced temperature of about 84° K. and the expanded discharged stream 86 is divided into two portions, one of which at 88 is also introduced as feed at 52 into the main distillation column 44, and a second portion 90 of expanded air stream 86 is passed into the cold end 91 of the main heat exchanger 26, and passed through coil 92 therein to provide additional cooling for the air feed streams passing through coils 24 and 62, and is discharged at 94.

The cold nitrogen overhead 38 from the initial separation zone 36, at a pressure of about 2.4 atmospheres and a temperature of about 84° K. is first passed through coil 32 of the heat exchanger 30 wherein the cold compressed nitrogen is warmed to about 95° K. against cold low pressure air feed passing through coil 28, and the exiting cold nitrogen is then compressed at 96 to a pressure where it will liquefy against boiling oxygen in the argon separation zone 48, operating at a pressure of 1.3 atmospheres. The compressor 96 is coupled at 97 to the expander 85, so that the energy derived from expanding the cold compressed air stream 68 is utilized for further compression of the cold compressed nitrogen stream 34.

The nitrogen compressor discharge 98 at a temperature of 120° K. and compressed to a pressure of about 5 atmospheres is passed through coil 100 in the cold end 91 of the main heat exchanger 26, in which the superheat of the compressed nitrogen is removed, and the exiting further compressed nitrogen at 102 is passed through passages 104 extending lengthwise in the lower portion of the heat exchange unit 71, and in heat exchange relation with the lower portion of the argon separation column 48, and providing additional reboil heat for the liquid oxygen therein, and for the lower portion of column 44. The condensed liquid nitrogen exiting at 106 from the upper ends of the passages 104 is further subcooled by passage through coil 108 of a heat exchanger 110 against cold nitrogen vapor passing through coil 112 of such heat exchanger, and the exiting subcooled liquid nitrogen at 114 is throttled at 116 to a reduced pressure of about 1.3 atmospheres and a reduced temperature of about 79°K., and is introduced at 118 as reflux into the upper end of the main distillation column 44.

The overhead nitrogen vapor at 120 from the main distillation column 44 is passed through coil 112 of the heat exchanger 110 for subcooling compressed liquid nitrogen, as above described, and the exiting nitrogen at 122, at a temperature of 85° K. is passed through coil 124 of the main heat exchanger 26 for cooling the incoming compressed feed streams at 24 and 62, and is discharged at 125.

The crude cold argon vapor overhead at 60 from the argon separation zone 48, at a temperature of 88° K. is passed through coil 126 of the main heat exchanger 26, for cooling incoming compressed air feed streams at 24 and 62, and discharged at 127, and the high purity oxygen liquid withdrawn at 58 from the bottom of the argon separation zone 48, at a pressure of about 1.3 atmospheres and a temperature of 90° K., is passed through coil 128 of the heat exchanger 26 for cooling the incoming compressed air streams, and is discharged as high purity oxygen product at 130.

It will be noted in the preferred process and system described above and illustrated in the drawing, that the oxygen-rich liquid air passing through heat exchange passages 42, the cold compressed air feed stream passing through passages 70 and 80, and the cold compressed nitrogen passing through the passages 104, are brought into heat exchange relation along the associated separation zones, effecting a non-adiabatic differential distillation throughout the various separation zones 36, 44 and 48. In this manner, substantially greater efficiency is achieved and equilibrium between liquid and vapor is obtained substantially incrementally throughout the height of each of the separation columns or zones 36, 44 and 48, by adding heat along the lower portion of each of such zones and removing heat along the upper portion of each such columns or zones. Such continuous incremental addition of heat to the lower portion of the columns and continuous incremental removal of heat from the upper portion of the columns effected by passing heat exchange fluid in heat exchange relation along the length of each column as noted above, effects a non-adiabatic differential distillation rather than the conventional fractional distillation, whereby equilibrium is much more closely approached throughout the column, thereby substantially increasing the efficiency of each of such separation zones or columns.

The heat exchange passages or constructions 42, 70, 80 and 104, for passage of the oxygen-rich liquid air, compressed air streams and cold compressed nitrogen as heat exchange fluids, can be in the form of a plate-fin heat exchanger (not shown) arranged in heat exchange relation with channels bearing the liquid-vapor mixture being separated in the respective zones 36, 44 and 48. Such channels may be constructed in the manner of a series of vertically spaced horizontal perforated partitions extending across the column and forming a series of enclosed spaces, as described in the copending application Ser. No. 685,013 filed Nov. 22, 1967, of Michael L Hoffman et al., or can be formed of two or more series of corrugated vertically spaced sheets, each of the two series of sheets extending horizontally, with one series of such sheets being offset from the other series, and forming a plurality of vertical channels or paths for a vapor-liquid mixture, as described in the copending application Ser. No. 685,012 filed Nov. 22, 1967, of Michael L. Hoffman. Also, a heat exchanger arrangement or construction of the type disclosed in the copending application Ser. No. 572,135, filed Aug. 12, 1966, of James D. Yearout can be employed. Since such heat exchanger arrangements or constructions per se form no part of the present invention, they are not shown herein, but the descriptions thereof set forth in the above-identified applications are incorporated herein by reference. However, any other suitable form of heat exchanger apparatus can be employed in providing the unit 46 containing the separation zones 36, 44 and 48, positioned in indirect heat exchange relation with the passages 42, 70, 80 and 104, as described above and shown in the drawing, so as to effect the above-described differential distillation in the respective zones of unit 46.

It will be understood that the system described above including the temperatures and pressures set forth are only illustrative and are not intended as limitative of the invention.

In the system described above and illustrated in the drawing, it will be noted, of particular significance, that a substantial portion of the air feed, e.g., from about 30% to about 50%, is relatively low pressure feed, e.g., about 2 to about 3 atmospheres, and the remainder being relatively high pressure feed, e.g., from about 4 to about 6 atmospheres.

Referring to the drawing, instead of subcooling the oxygen-rich liquid air removed at 40 in passages 42, such mixture can be subcooled in a conventional heat exchanger, and then introduced at suitably reduced pressure as feed into the main distillation zone 44. Also, such subcooling can be entirely omitted, and the oxygen-rich liquid air mixture at 40, after suitable throttling to the pressure in the main distillation zone 44, can be introduced therein as feed. Under these conditions, the system shown in the drawing can be modified to eliminate passages 42, with zones 36 and 44 being maintained in associated heat exchange relation, as illustrated in the drawing.

Although in the system described above and in the drawing, a portion 88 of the work expanded high pressure air stream is employed as additional feed for the main distillation column, if desired, under suitable conditions, such additional feed can be omitted, and all of the work expanded high pressure air feed at 86 can be passed through coil 92 of the main heat exchanger to supply refrigeration for the incoming compressed air streams.

From the foregoing, it is seen that the invention provides a novel method and system for producing high purity oxygen product, employing an air feed wherein only a portion of the air feed is required to be compressed at pressures of the order of say 4 to 6 atmospheres, a substantial portion of the air feed being employed at an intermediate or reduced pressure, thereby providing high purity oxygen recovery with substantially reduced power consumption and thus substantially reducing the cost of operation of the system, and preferably employing a highly efficient rectification system, involving the use of non-adiabatic differential distillation. The invention process and system employing cold nitrogen compression as a feature of the invention, avoids a recycle nitrogen refrigeration loop, and the power for such cold compression is provided by work expansion of a cooled portion of the high pressure air feed stream, which in turn is employed to provide refrigeration for the compressed air streams, while another portion of the cooled high pressure air feed stream is employed for providing reboil and condensing duty in the system.

While I have described the particular embodiments of my invention for the purpose of illustration, it should be understood that various additional modifications and adaptations thereof may be made within the spirit of the invention, and within the scope of the appended claims.

I claim:

1. A process for the separation of high purity oxygen from air, which comprises providing two compressed air feed streams, a first air stream being an intermediate pressure stream and a second being a relatively high pressure stream, cooling said first intermediate pressure stream and a first portion of said second high pressure stream approximately to their respective saturation temperatures, cooling a second portion of said second high pressure air stream, work expanding said cooled second portion of said second stream and further reducing the temperature thereof, passing at least a portion of the resulting work expanded and further cooled second portion of said second air stream into heat exchange relation with said compressed air feed streams for cooling the same as aforesaid, introducing said first cooled compressed air stream into a first separation zone, removing cold compressed nitrogen as overhead from said zone, withdrawing an oxygen-rich liquid air mixture from said first separation zone, reducing the pressure of said liquid air mixture and introducing the resulting oxygen-rich liquid air mixture as feed into a second main distillation zone, said second zone operating at a pressure lower than the pressure in said first separation zone, withdrawing nitrogen overhead from said main distillation zone, withdrawing crude liquid oxygen containing a minor portion of argon from the bottom of said main distillation zone, introducing said crude liquid oxygen as feed into a third argon separation zone, separating argon and removing high purity oxygen from said crude liquid oxygen in said third separation zone, withdrawing high purity oxygen and an overhead argon-containing vapor from said third zone, employing said first cooled compressed portion of said high pressure air stream to provide reboiling and condensing duty, further compressing said cold nitrogen overhead from said first separation zone, and employing said cold further compressed nitrogen for reboiling duty, and then as reflux to said main distillation zone.

2. A process as defined in claim 1, wherein said first separation zone, said main distillation zone and said argon separation zone are associated in heat exchange relation to provide the requisite condensing and reboiling duty for each of said zones, said main distillation zone being positioned between said first and third separation zones.

3. A process as defined in claim 1, wherein a portion of said work expanded and further cooled second portion of said second air stream is also introduced as feed into said main distillation zone, and wherein the energy derived from said work expansion of said second portion of said second air stream is employed for said further compression of said cold nitrogen overhead from said first separation zone.

4. The process as defined in claim 2. including subcooling said oxygen-rich liquid air mixture withdrawn from said first separation zone, and throttling the resulting subcooled oxygen-rich liquid mixture prior to introduction thereof as feed into said second main distillation zone.

5. A process as defined in claim 4, wherein said subcooling of said oxygen-rich liquid air mixture is carried out by passing said liquid mixture in heat exchange relation between and along said first separation zone and said second main distillation zone.

6. A process as defined in claim 2, wherein said first cooled portion of said second high pressure air feed stream is passed in heat exchange relation along the lower portion of said third argon separation zone to provide reboil heat, and is thereby condensed, and the resulting condensed liquid air stream is throttled to reduced pressure and temperature, and said throttled liquid first portion of said second air stream is passed in heat exchange relation along the upper portion of said third separation zone to provide condensing duty, and is thereby vaporized, and including combining the resulting vaporized first portion of said second air stream with said first cooled compressed intermediate pressure air stream prior to introduction thereof into said first separation zone.

7. A process as defined in claim 2, wherein said further compressed nitrogen is employed to provide reboil heat for said third separation zone, and is thereby condensed, and the resulting condensed compressed liquid nitrogen is throttled and said throttled nitrogen is introduced as reflux into the top of said second main distillation zone.

8. A process as defined in claim 2, wherein a portion of said work expanded and further cooled second portion of said second air stream is also introduced as feed into said main distillation zone, and wherein the energy derived from said work expansion of said second portion of said second air stream is employed for said further compression of said cold nitrogen overhead from said first separation zone, and said further compressed nitrogen is cooled and then passed in heat exchange relation along the lower portion of said third separation zone to provide reboil heat therein, and is thereby condensed, and the resulting condensed compressed liquid nitrogen is throttled and said throttled nitrogen is introduced as reflux into the top of said main distillation zone.

9. A process as defined in claim 8 and wherein said first cooled portion of said second high pressure air feed stream is passed in heat exchange relation along the lower portion of said third argon separation zone to provide reboil heat, and is thereby condensed, and the resulting condensed liquid air stream is throttled to reduced pressure and temperature, and said throttled liquid first portion of said second air stream is passed in heat exchange relation along the upper portion of said third separation zone to provide condensing duty, and is thereby vaporized, and including combining the resulting vaporized first portion of said second air stream, at about the pressure of said first intermediate pressure air stream, with said first cooled compressed intermediate pressure air stream prior to introduction thereof into said first separation zone.

10. A process as defined in claim 9, wherein said first cooled intermediate pressure air stream is passed in heat exchange relation with cold nitrogen overhead from said first separation zone prior to further compression thereof, to warm said cold nitrogen and further cool said cooled first air stream, and said compressed liquid nitrogen withdrawn from heat exchange relation with the lower portion of said third separation zone is subcooled prior to said throttling thereof, by passage of said last-mentioned liquid nitrogen in heat exchange relation with overhead nitrogen from said main distillation zone, and wherein said subcooling of said oxygen-rich liquid air mixture is carried out by passing said liquid mixture in heat exchange relation between and along said first separation zone and said second main distillation zone.

11. A process as defined in claim 10, wherein said high purity oxygen, said overhead nitrogen from said second main distillation zone, and the overhead argon-containing vapor from said third argon separation zone, are all passed in heat exchange relation with the compressed air feed streams for cooling same.

12. A process as defined in claim 1, wherein said high purity oxygen, said overhead nitrogen from said second main distillation zone, and the overhead argon-containing vapor from said third argon separation zone, are all passed in heat exchange relation with the compressed air feed streams for cooling same.

13. A system for the separation of high purity oxygen from air, including means forming a first separation zone, a second main distillation zone, and a third argon separation zone, means providing a first intermediate pressure air feed stream and a second relatively high pressure air feed stream, means for cooling said first intermediate pressure stream and a first portion of said second high pressure stream approximately to their respective saturation temperatures, means for cooling a second portion of said second high pressure air stream, work expansion means for work expanding said cooled second portion of said second stream, means for passing at least a portion of the resulting work expanded second portion of said second air stream into heat exchange relation with said compressed air feed streams for cooling same as aforesaid, means for introducing said first cooled compressed air stream into said first separation zone, means for removing cold compressed nitrogen as overhead from said last-mentioned zone, means for withdrawing an oxygen-rich liquid air mixture from said first separation zone, means for reducing the pressure of said liquid air mixture and for introducing the resulting oxygen-rich liquid air mixture as feed into said second main distillation zone, means for withdrawing nitrogen overhead from said main distillation zone, means for withdrawing crude liquid oxygen from the bottom of said main distillation zone, means for introducing said crude liquid oxygen as feed into said third argon separation zone, means for withdrawing high purity oxygen and an overhead argon-containing vapor from said third zone, means for employing said first cooled compressed portion of said second high pressure air feed stream to provide reboiling and condensing duty in said system, means for further compressing said cold nitrogen overhead from said first separation zone, and means for employing said further compressed nitrogen for reboiling duty and as reflux in said system.

14. A system as defined in claim 13, wherein said first separation zone, said second main distillation zone and said third argon separation zone are associated in heat exchange relation, said second main distillation zone being positioned between said first and third separation zones, said third argon separation zone being in heat exchange relation with the lower portion of said second main distillation zone, and including means for subcooling said oxygen-rich liquid air mixture withdrawn from said first separation zone, including passage means between and along said first separation zone and said second main distillation zone, and including throttling means as said pressure reducing means for reducing the pressure of said liquid air mixture prior to introduction thereof into said second main distillaton zone.

15. A system as defined in claim 14, including means for passing said first portion of said second high pressure air feed stream in heat exchange relation along the lower portion of said third separation zone to provide reboil heat, means for throttling the exiting condensed liquid air stream, means for passing the resulting throttled liquid in heat exchange relation along the upper portion of said third separation zone, and means for combining the resulting vaporized stream withdrawn from heat exchange relation with the upper portion of said third distillation zone, with the first cooled intermediate pressure air stream prior to introduction thereof into said first separation zone, means for introducing a portion of said work expanded second portion of said second air stream as feed into said second main distillation zone, and including means for cooling said further compressed nitrogen, means for passing the resulting cooled compressed nitrogen in heat exchange relation along the lower portion of said third separation zone, means for throttling the resulting compressed liquid nitrogen, and means for introducing said throttled nitrogen into the top of said second main distillation zone.

16. A system as defined in claim 15, including means for passing said high purity oxygen withdrawn from said third argon separation zone, the overhead argon-containing vapor from said third argon separation zone, and said overhead nitrogen from said second main distillation zone, all in heat exchange relation with said compressed air feed streams for cooling same.

References Cited
UNITED STATES PATENTS

| | | | |
|---|---|---|---|
| 1,257,470 | 2/1918 | Filippo et al. | 62—34 |
| 2,620,637 | 12/1952 | Schilling. | |
| 2,760,351 | 8/1956 | Schilling. | |
| 2,779,174 | 1/1957 | Vesque. | |
| 3,062,016 | 11/1962 | Dennis et al. | 62—22 |
| 3,208,231 | 9/1965 | Becker | 62—26 |
| 3,264,830 | 8/1966 | Smith | 62—22 |
| 3,358,460 | 12/1967 | Smith et al. | 62—38 |
| 3,383,873 | 5/1968 | Becker | 62—26 |
| 3,392,536 | 7/1968 | Smith | 62—26 |

WILBUR L. BASCOMB, JR., Primary Examiner

U.S. Cl. X.R.

62—26, 30, 31, 34, 38